(12) United States Patent
Bishop et al.

(10) Patent No.: US 8,103,852 B2
(45) Date of Patent: Jan. 24, 2012

(54) INFORMATION HANDLING SYSTEM INCLUDING A PROCESSOR WITH A BIFURCATED ISSUE QUEUE

(75) Inventors: James Wilson Bishop, Newark Valley, NY (US); Mary Douglass Brown, Austin, TX (US); William Elton Burky, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/342,045

(22) Filed: Dec. 22, 2008

(65) Prior Publication Data

US 2010/0161942 A1 Jun. 24, 2010

(51) Int. Cl.
*G06F 15/76* (2006.01)
(52) U.S. Cl. .......................................................... 712/7
(58) Field of Classification Search .................. None
See application file for complete search history.

(56) References Cited

U.S. PATENT DOCUMENTS

| | | | |
|---|---|---|---|
| 5,699,537 A | 12/1997 | Sharangpani | |
| 5,710,902 A * | 1/1998 | Sheaffer et al. | 712/216 |
| 5,872,988 A | 2/1999 | Duranton | |
| 5,918,034 A | 6/1999 | Petolino | |
| 6,000,036 A | 12/1999 | Durham | |
| 6,016,540 A * | 1/2000 | Zaidi et al. | 712/214 |
| 6,212,622 B1 * | 4/2001 | Witt | 712/216 |
| 6,609,190 B1 * | 8/2003 | Kahle et al. | 712/214 |
| 6,839,828 B2 * | 1/2005 | Gschwind et al. | 712/20 |
| 7,769,984 B2 * | 8/2010 | Alexander et al. | 712/214 |
| 2003/0182537 A1 | 9/2003 | Le | |
| 2003/0182540 A1 | 9/2003 | Burky | |
| 2003/0225992 A1 | 12/2003 | Venkatrao | |
| 2008/0133890 A1 | 6/2008 | Le | |
| 2009/0276608 A1 * | 11/2009 | Shimada et al. | 712/216 |

OTHER PUBLICATIONS

Biswas—"Attribute Allocation in Large Scale Sensor Networks" —OBR Research Center for Distributed and Mobile Computing, Dept of ECECS, University of Cincinnati (Apr. 2005).
Kahle—"Introduction to the Cell Multiprocessor" = IBM Journal of Research and Development (Jul. 2005).
Kumar—"Express Virtual Channels: Towards the Ideal Interconnection Fabric" —Dept. of Electrical Engineering, Princeton University, Princeton NJ (Jun. 2007).
Zhou-1—"Heterogeneously Tagged Caches for Low-Power Embedded Systems with Virtual Memory Support" —University of Maryland, College Park (Apr. 2008).

(Continued)

*Primary Examiner* — Jacob A Petranek
(74) *Attorney, Agent, or Firm* — Matt Talpis; Mark P Kahler (57) ABSTRACT

An information handling system includes a processor with a bifurcated unified issue queue that may perform unified issue queue VSU store instruction dependency operations. The bifurcated unified issue queue BUIQ maintains VSU store instructions in the form of internal operations data. The BUIQ includes a unified issue queue UIQ 0 and a unified issue queue UIQ 1. The BUIQ may manage a particular VSU store instruction from one UIQ to determine data dependencies and employ the other UIQ to determine address dependencies of that particular VSU store instruction. The UIQs employ a dependency matrix including a dependency array. The dependency array data maintains both data and address dependency information. The particular VSU store instruction issues to execution units such as VSUs for data dependency information and load store units (LSUs) for address dependency information. A particular VSU store instruction may execute to provide data dependency information independent of address dependency information.

14 Claims, 4 Drawing Sheets

OTHER PUBLICATIONS

Zhou-2—"Energy-Efficient Address Translation for Virtual Memory Support in Low-power and Real-Time Embedded Processors"—University of Maryland, College Park (Sep. 2005).

ABST—"The Cray Black Widow: A Highly Scalable Vector Mutliprocessor"—SC07 (Nov. 2007).

Surrendra—"Exploiting The Behavior of Ready Instructions for Power Benefits in a Dynamically Scheduled Embedded Processor"—48th IEEE Symposium on Circuits and Systems (2004).

* cited by examiner

INFORMATION HANDLING SYSTEM INCLUDING A PROCESSOR WITH A BIFURCATED ISSUE QUEUE

This invention was made with United States Government support under Agreement No. HR0011-07-9-0002 awarded by DARPA. The Government has certain rights in the invention.

BACKGROUND

The disclosures herein relate generally to processors, and more specifically, to processors that employ instruction issue queue dependency management for store instructions.

Modern information handling systems (IHSs) often execute instruction out-of-order to achieve greater processing efficiency. Because out-of-order instruction handling is common in modern IHSs, processors typically track the dependencies between instructions in an issue queue such as a unified issue queue (UIQ). Many issue queues store respective single instructions in the particular locations that require individual reads and writes. However, a unified issue queue (UIQ) provides multiple queues for parallel instruction reads and writes. A particular instruction may not issue from the issue queue until dependencies for that particular instruction are met. These dependencies may include data dependencies and address dependencies. A particular instruction may issue to an execution unit when the processor determines that data dependency, address dependency, or other dependency requirements are met. That particular instruction may issue to an execution unit within the processor for further processing.

Vector scalar unit (VSU) store instructions are a type of instruction that involve operations relating to binary floating point instructions. The VSU is responsible for all vector and floating point instructions. During instruction decoding, a decode unit may identify instructions or internal operations (IOPs) that require execution by a special VSU type of execution unit (EU). Instructions or IOPs that require a VSU EU include VSU store instructions, VSX instructions, and other binary floating point instructions. VSU store instructions may exhibit data, address, and other dependencies. VSU store instructions in the issue queue may issue when their data dependencies, address dependencies, or other dependencies clear. VSU store and other instructions may group into IOP groups that share a common relationship within processor 200 instructions.

BRIEF SUMMARY

Accordingly, in one embodiment, a method of processing instructions, by a processor is disclosed. The method includes fetching, by a fetch unit, instructions from a memory store to provide fetched instructions. The method also includes decoding, by a decode unit, the fetched instructions into decoded instructions and determining which of the decoded instructions are vector scalar unit (VSU) store instructions. The method further includes grouping, by the decode unit, VSU store instructions into internal operation (IOP) groups wherein each IOP group includes a group of VSU store instructions. The method still further includes dual dispatching, by the dispatch unit, VSU store instructions into a bifurcated unified issue queue (BUIQ) that includes both data dependency information and address dependency information.

In another embodiment, a processor includes a memory store that stores instructions. The processor also includes a fetch unit, coupled to the memory store, that fetches instructions from the memory store to provide fetched instructions. The processor further includes a decode unit, coupled to the fetch unit, that decodes the fetched instructions into decoded instructions, the decode unit determining which of the decoded instructions are vector scalar unit (VSU) store instructions, the decode unit grouping the VSU store instructions into internal operation (IOP) groups. The processor still further includes a dispatch unit, coupled to the decode unit, that dispatches VSU store instructions. The processor also includes a bifurcated unified issue queue (BUIQ) that includes both data dependency information and address dependency information.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

One embodiment of the disclosed information handling system (IHS) employs a processor that includes a unified issue queue (UIQ). As used herein the term "unified" means that the processor groups instructions together and stores these grouped or unified instructions together as entries in one or more unified issue queues (UIQs). The UIQ may issue a VSU store instruction to a VSU for execution. The UIQ may manage data dependencies and address dependencies of a particular VSU store instruction along with other store instructions in the UIQ.

In one embodiment, the UIQ of the disclosed processor is a bifurcated UIQ (BUIQ). The bifurcated UIQ (BUIQ) includes multiple unified issue queues (UIQs) for handling a particular VSU store instruction with data and address dependencies. The BUIQ includes a unified issue queue 0 (UIQ 0), and unified issue queue 1 for independently handling a particular VSU store instruction's data and address dependencies. When handling a particular VSU store instruction, the BUIQ may store the same particular VSU store instruction in both UIQ 0 and UIQ 1 along with relative data and address dependency information as described in more detail below. UIQ 0 and UIQ 1 may issue VSU store instructions independently to a VSU execution unit or load store unit (LSU) to provide data and address information that affects the data and address dependencies. In one example, UIQ 0 and UIQ 1 provide processor resources with independent data and address dependency capability for VSU store instructions.

Figure 1:
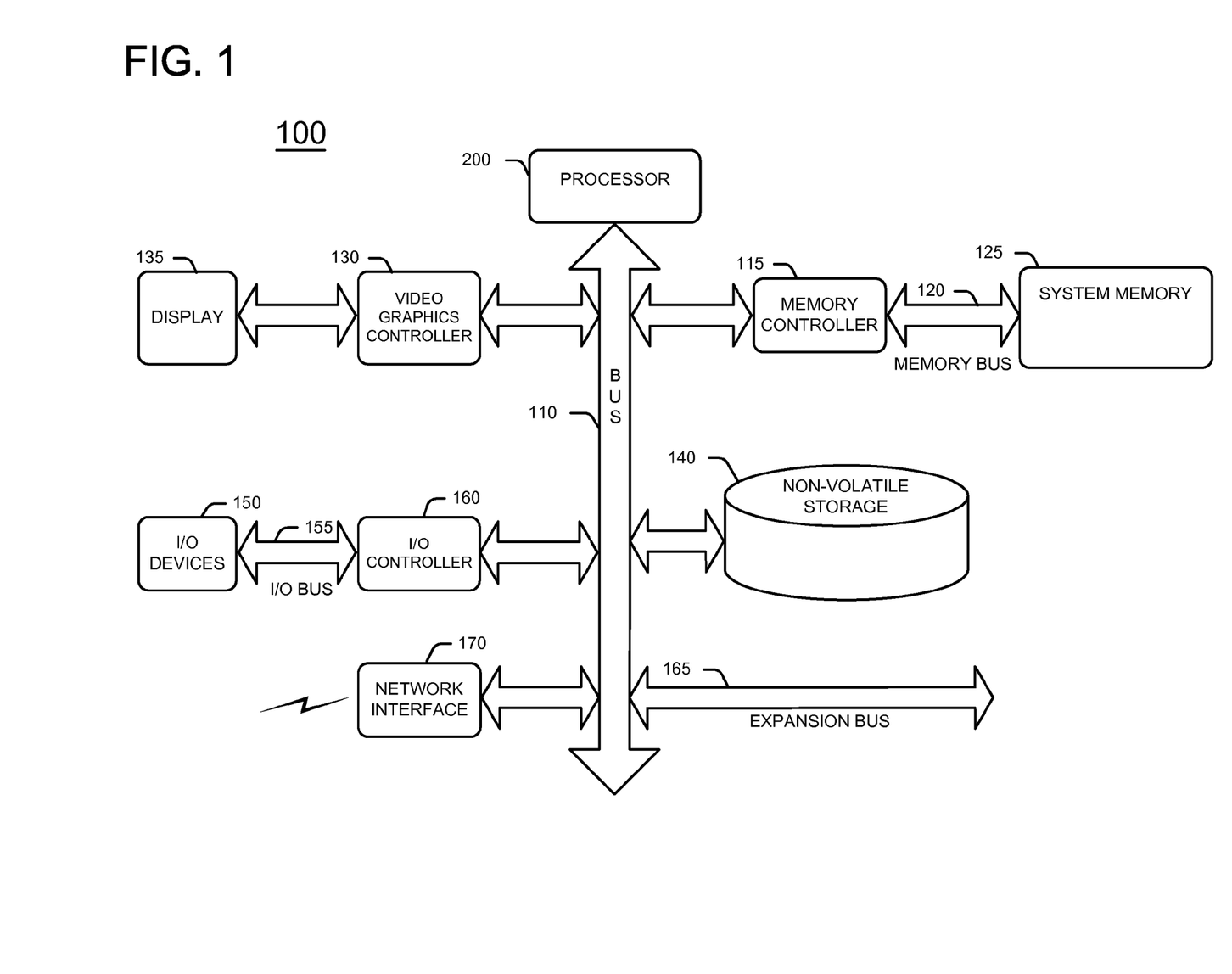
FIG. 1 is block diagram of an information handling system (IHS) that includes the disclosed processor with bifurcated unified issue queue (UIQ) VSU store instruction dependency methodology.

FIG. 1 shows an information handling system (IHS) 100 that includes a processor 200 that may employ the disclosed UIQ VSU store instruction dependency method. Processor 200 couples to a bus 110. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

Figure 2:
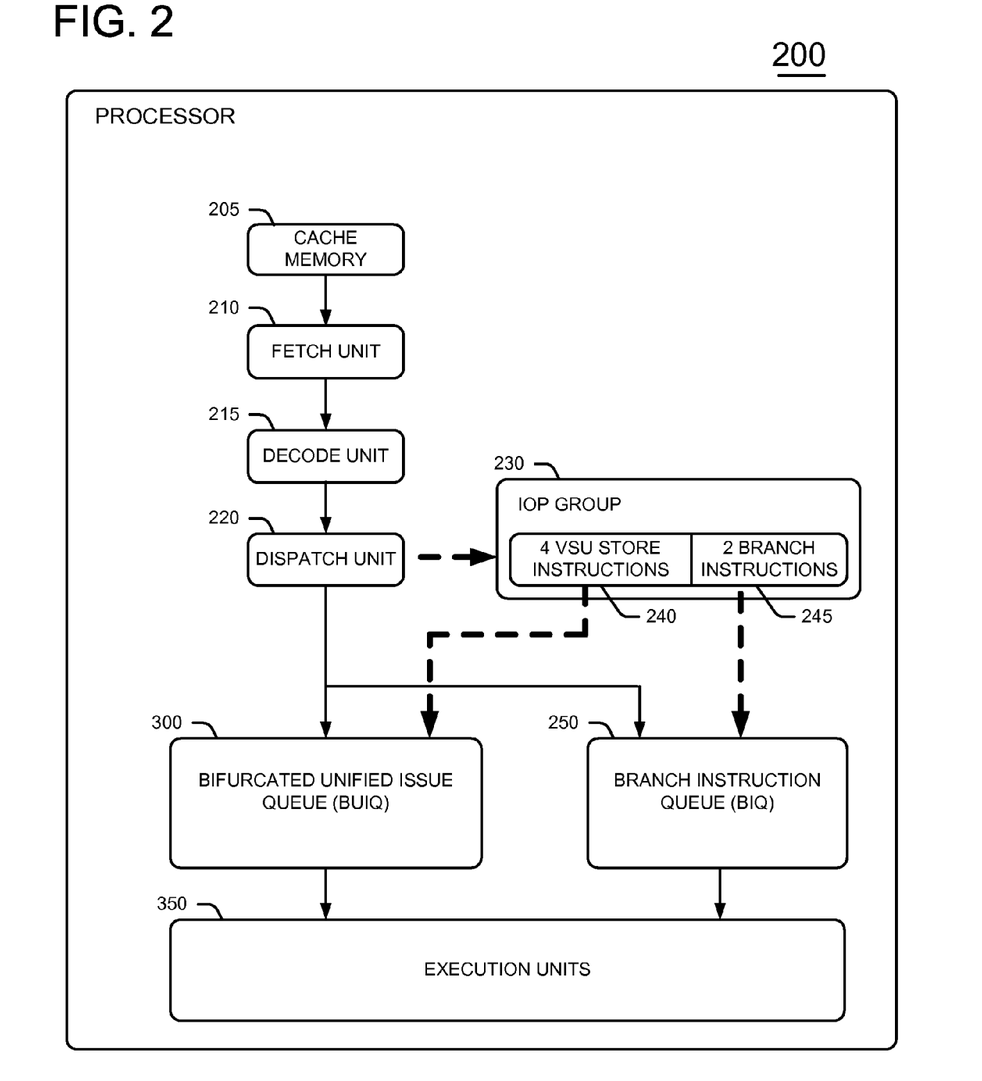
FIG. 2 is a block diagram showing more detail of the processor that employs the bifurcated UIQ VSU store instruction dependency methodology.

FIG. 2 shows a processor 200 that may employ the disclosed UIQ VSU store instruction dependency method. In that case, processor 200 performs the functional blocks of the flowchart of FIG. 4 described below that apply to the UIQ VSU store instruction dependency handling process. Processor 200 includes a cache memory 205 that may receive processor instructions from system memory 125, non-volatile storage 140, expansion bus 165, network interface 170, or other sources not shown in FIG. 2. Cache memory 205 couples to a fetch unit 210 that processor 200 employs to fetch multiple instructions from cache memory 205. Instructions may be in the form of an instruction stream that includes a series or sequence of processor program instructions. Fetch unit 210 couples to a decode unit 215 that provides decoding of instructions as resources of processor 200 become available. Decode unit 215 decodes and identifies VSU store instructions or internal operations (IOPs). Decode unit 215 couples to a dispatch unit 220 that may dispatch VSU store instructions and other instructions as a special instruction group or IOP group, such as an IOP group 230 that includes multiple VSU store and other instructions.

In one embodiment, IOP group 230 includes 6 instructions. For example, IOP group 230 includes 4 VSU store instructions 240 that are non-branch instructions and 2 branch instructions 245 to form a complete IOP group 230. Dispatch unit 220 dispatches IOP group 230 as shown by the dotted line and arrow from dispatch unit 220 to IOP group 230. Dispatch unit 220 couples to a bifurcated unified issue queue BUIQ 300 and a branch issue queue (BIQ) 250. BUIQ 300 may store non-branch IOP group 230 instructions in the form of multiple VSU store instructions, such as 4 VSU store instructions 240. BIQ 250 may store the branch instructions of IOP group 230 in the form of branch instructions, such as 2 branch instructions 245. BUIQ 300 and BIQ 250 couple to execution units EU 350. EU 350 may include multiple execution units for execution of VSU store and other instructions. In one embodiment, the 4 VSU store instructions 240 dispatch to BUIQ 300 as shown by the dotted line and arrow from IOP group 230 to BUIQ 300. The 2 branch instructions 245 dispatch to BIQ 250 as shown by the dotted line and arrow from IOP group 230 to BIQ 250. In this manner, the 6 instructions of IOP group 230 dispatch to their respective issue queues for execution and further processing by processor 200.

Although the example of IOP group 230 depicts 4 VSU store instructions 240 and 2 branch instructions 245, other IOP group sizes and organizations are possible. For example, dispatch unit 220 may not fully populate IOP group 230 with 6 instructions. IOP group 230 in this example may include less than 6 total instructions. Dispatch unit 220 may determine the best VSU store and branch instruction count and organization for best performance during processor 200 instruction handling. Although BIQ 250 includes branch instructions for execution by branch execution units of EU 350, BUIQ 300 includes only non-branch instructions. These non-branch instructions may include VSU store instructions, VMX instructions, such as vector multimedia instructions, or other non-branch instructions.

Figure 3:
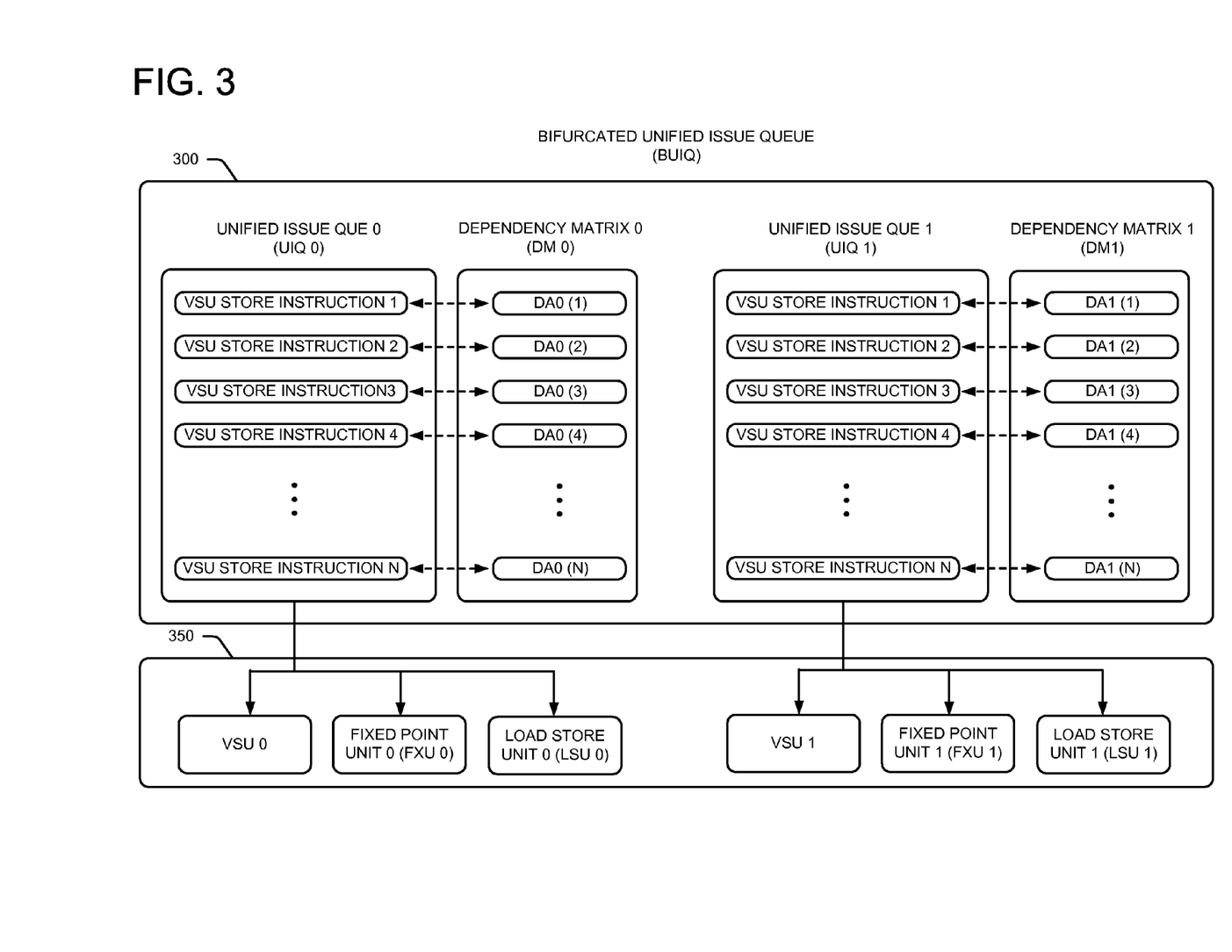
FIG. 3 depicts more detail of the bifurcated UIQ that employs the VSU store instruction dependency methodology.

FIG. 3 shows more detail of bifurcated unified issue queue BUIQ 300 and execution units EU 350 that employ the disclosed UIQ VSU store instruction dependency method. BUIQ 300 includes a unified issue queue UIQ 0 and a unified issue queue UIQ 1. UIQ 0 and UIQ 1 store non-branch instructions, such as VSU store instructions. For example, UIQ 0 and UIQ 1 may include 4 VSU store instructions 240 of IOP group 230. In one embodiment, 4 VSU store instructions 240 dispatch to UIQ 0 and UIQ 1 in one processor 200 clock cycle. In that manner, both UIQ 0 and UIQ 1 may store the same 4 VSU store instructions 240 at the same time. UIQ 0 of FIG. 3 depicts locations for VSU store instruction 1, 2, 3, and 4 of four VSU store instructions 240.

UIQ 0 includes locations for up to N VSU store instructions or other non-branch instructions. VSU store instruction N represents the Nth location in UIQ 0 for such non-branch instructions. UIQ 0 includes a dependency matrix DM0 that provides dependency array data for each location within UIQ 0. In that manner, each location within UIQ 0 includes a representative dependency array, such as DA0 (1) for VSU store instruction 1. UIQ 0 includes a representative dependency array DA0 (2) for VSU store instruction 2 and so forth until UIQ 0 includes representative dependency array DA0 (N) for VSU store instruction N. Dependency matrix DM0 includes a respective dependency array DA0 (1) through DA0 (N) for VSU store instructions 1 through N within UIQ 0. DA0 (1) through DA0 (N) include respective dependency flags for data, address, and other dependencies for each VSU store instruction 1 through N.

In a manner similar to the topology of UIQ 0, UIQ 1 includes locations for VSU store instruction 1, 2, 3, and 4 of four VSU store instructions 240. UIQ 1 includes locations for up to N VSU store, or other non-branch instructions. VSU store N represents the Nth location in UIQ 1 for such non-branch instructions. UIQ 1 includes a dependency matrix DM1, that provides dependency array data for each location within UIQ 1. In this manner, UIQ1 includes a respective dependency array for each location of UIQ1, such as representative dependency array DA1 (1) for VSU store instruction 1. UIQ 1 together with DM1 provide processor 200 with a VSU store instruction data and address dependency matrix of information. UIQ 1 includes a respective dependency array DA1 (2) for VSU store instruction 2 and so forth until UIQ 1 includes respective dependency array DA1 (N) for VSU store instruction N.

Dependency matrix DM1 includes respective dependency arrays DA1 (1) through DA1 (N) for each of VSU store instructions 1 through N within UIQ 1. DA1 (1) through DA1 (N) include dependency information for data, address, and other dependencies for each respective VSU store instruction 1 through N of UIQ 1. UIQ 1 with DM1 provides processor 200 with VSU store instruction data and address dependency matrix of information. In one embodiment, UIQ 0 and UIQ 1 each store the 4 VSU store instructions 240 at the same time. Although FIG. 3 depicts each UIQ 0 and UIQ 1 locations as having the first 4 locations each for 4 VSU store instructions 240 of IOP group 230, the particular VSU store instructions, such as VSU store instruction 1 may reside in any particular location within UIQ 0 or UIQ 1.

UIQ 0 couples to multiple execution units, namely VSU 0, fixed point unit FXU 0, and load store unit LSU 0. UIQ 0 may couple to other execution units, such as floating point units (FPUs), and other execution units not shown. VSU 0 executes VSU store instructions, such as VSU store instruction 1 through VSU store instruction N. VSU 0 generates VSU store instruction "data" as output. In that manner, a particular VSU store instruction, such as VSU store instruction 1 of UIQ 0, uses VSU 0 to provide the "data" result of VSU store instruction 1 execution. In a similar manner, LSU 0 executes VSU store instructions, such as VSU store instruction 1 through VSU store instruction N. LSU 0 generates VSU store instruction "address" information as output. In that manner, a particular VSU store instruction, such as VSU store instruction 1 of UIQ 0 uses LSU 0 to provide the "address" resultant of VSU store instruction 1 execution. FXU 0 may provide execution results for VMX or other instructions of UIQ 0 not shown.

In a manner similar to UIQ 0, UIQ 1 couples to multiple execution units, namely VSU 1, fixed point unit FXU 1, and load store unit LSU 1. UIQ 1 may couple to other execution units, such as floating point units (FPUs), and other execution units not shown. VSU 1 executes VSU store instructions, such as VSU store instruction 1 through VSU store instruction N. VSU 1 generates VSU store instruction data as output. In that manner, a particular VSU store instruction, such as VSU store instruction 1 of UIQ 1 uses VSU 1 to provide the "data" resultant of VSU store instruction 1 execution. In a similar manner, LSU 1 may execute VSU store instructions, such as VSU store instruction 1 through VSU store instruction N. LSU 1 generates VSU store instruction "address" information as output. In that manner, a particular VSU store instruction, such as VSU store instruction 1 of UIQ 1 uses LSU 1 to provide the "address" resultant of VSU store instruction 1 execution. FXU 1 may provide execution results for VMX or other instructions of UIQ 1 not shown.

In one embodiment, UIQ 0 may use VSU 0 and LSU 0 to provide respective data and address execution results for a particular VSU store instruction. However, in that example, both data and address dependencies must clear before that particular VSU store instruction completes execution and the location for that particular VSU store instruction is useable by a next VSU store instruction from dispatch unit 330. In other words, UIQ 0 must hold a particular VSU store instruction in queue until the dependencies for that particular instruction clear. In another embodiment of the disclosed method, each UIQ, namely UIQ 0 and UIQ 1 independently manage data and address dependencies for a particular VSU store instructions. For example, VSU store instruction 1 within UIQ 0 may issue to VSU 0 to generate the VSU store "data" results therefor. In a similar manner, and at the same time, VSU store instruction 1 within UIQ 1 may issue to LSU 1 to generate the VSU store "address" results for VSU store instruction 1. In this manner, both UIQ 0 and UIQ 1 manage data and address dependencies for the same VSU store instruction, namely VSU store instruction 1 independently.

When VSU 0 completes execution of VSU store instruction 1, the data dependencies of DA0 (1) clear for VSU store instruction 1 of UIQ 0. That particular UIQ 0 location is then available for a next VSU store instruction from a next IOP group, such as that of IOP group 230 or other IOP group. In a similar manner, when LSU 1 completes execution of VSU store 1, the address dependencies of DA1 (1) clear for VSU store instruction 1 of UIQ 1. That particular UIQ 1 location is then available for a next VSU store instruction from a next IOP group, such as that of IOP group 230 or other group. UIQ 0 and UIQ 1 combine to perform the data and address dependency executions. However, by separating the data and address executions in VSU 0, and LSU 1, dispatch unit 220 is free to dispatch next VSU store instructions as locations within UIQ 0 and UIQ 1 become independently available.

Data and address dependencies of DM0 and DM1 do not limit either UIQ 0 or UIQ 1 to a particular data or address dependency operation. In fact, either UIQ 0 or UIQ 1 may manage a particular VSU store instruction data or address dependency operation or execution as processor 200 determines most efficient. This dynamic allocation of data and address dependencies for VSU store instructions provides greater flexibility and performance of IOP group 230 instruction execution. In one embodiment, processor 200 may use parallel operations to store 4 VSU store instructions 240 into both UIQ 0 and UIQ 1 respectively and at the same time. During the same processor clock cycle, UIQ 0 and UIQ 1 may both issue independent VSU store instructions to their respective execution units, such as VSU 0, LSU 0, VSU 1, and LSU 1.

Figure 4:
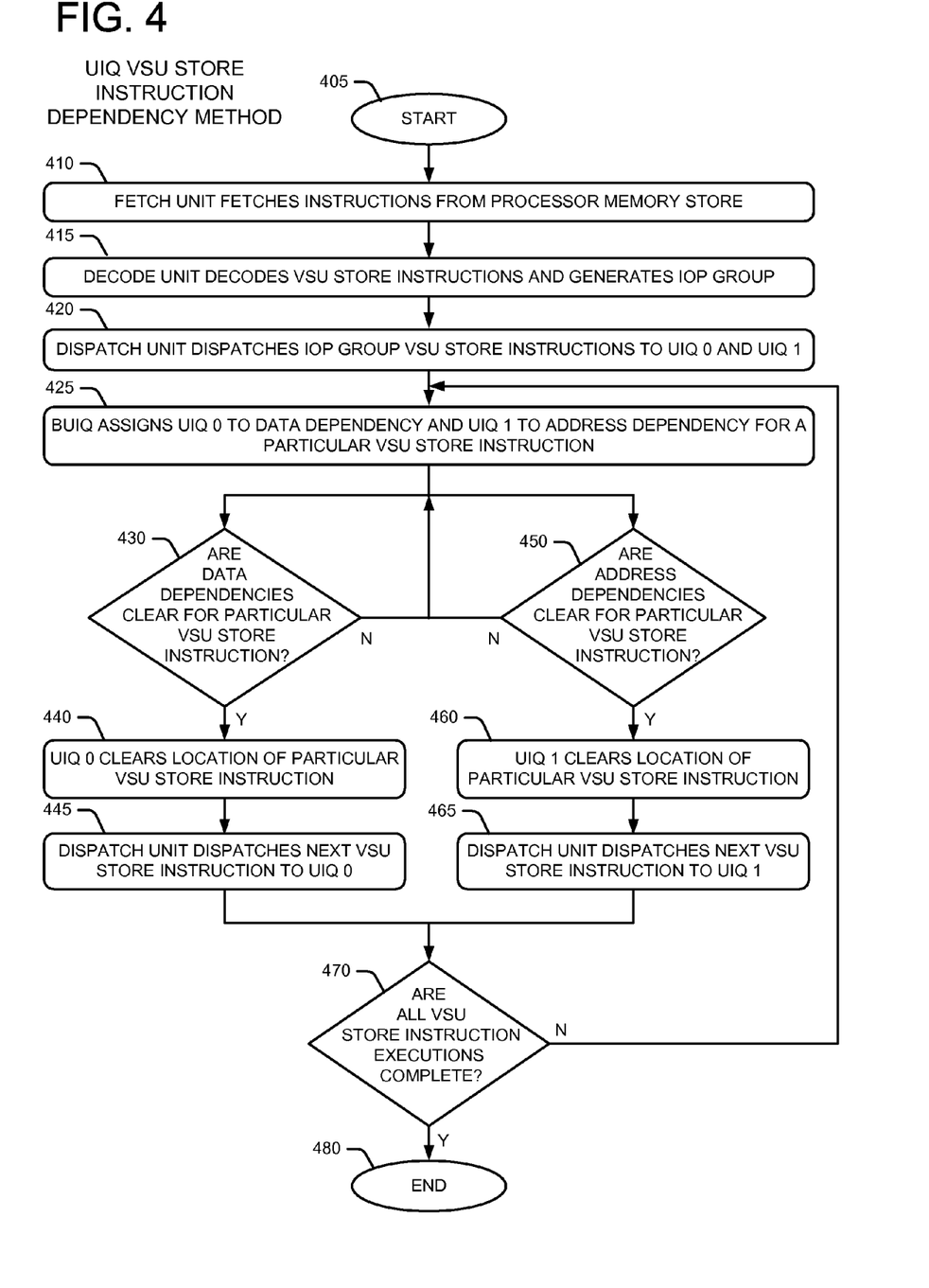
FIG. 4 is a flowchart that shows process flow in the processor of FIG. 2 as it employs the disclosed bifurcated UIQ VSU store instruction dependency method.

FIG. 4 shows a flowchart that describes one example of the disclosed UIQ VSU store instruction dependency method. The UIQ VSU store instruction dependency method starts, as per block 405, when processor 200 initializes. Fetch unit 210 fetches instructions from processor 200 memory store, as per block 410. Fetch unit 210 may fetch instructions from cache memory 205 or other memory store of processor 200. Decode unit 215 decodes VSU store instructions and generates an IOP group, as per block 415. Decode unit 215 identifies binary floating point VSU store instructions and generates an IOP group, such as IOP group 230. In one embodiment, IOP group 230 includes 4 VSU store instructions 240 and 2 branch instructions 245. In other embodiments, an IOP group may include a greater or lesser number of VSU store instructions and branch instructions, depending on the particular application.

VSU store instructions may require execution or operation within execution units VSU 0, LSU 0, VSU 1, LSU 1, or other execution units of processor 200. Dispatch unit 220 dispatches IOP group 230 VSU store instructions to UIQ 0 and UIQ 1 of bifurcated unified issue queue (BUIQ) 300, as per block 420. In other words, dispatch unit 220 dispatches 4 VSU store instructions 230 to UIQ 0 and UIQ 1 at the same time. In another embodiment, dispatch unit 220 may dispatch one or more VSU store instructions to UIQ 0 or UIQ 1 independently. BUIQ 300 assigns UIQ 0 to "data" dependency and UIQ 1 to "address" dependency for a particular VSU store instruction, as per block 425. In other words, in one example, BUIQ 300 assigns UIQ 0 as a data dependency manager for a particular VSU store instruction in UIQ 0, such as VSU store instruction 1. In a similar manner, BUIQ 300 assigns UIQ 1 as an address dependency manager for a particular VSU store instruction in UIQ 1, such as VSU store instruction 1. The BUIQ 300 dependency assignments are on a per VSU store instruction basis. In other embodiments, UIQ 0 and UIQ 1 may swap the data and address dependency management for any particular VSU store instruction therein.

BUIQ 300 performs a test to determine if all "data" dependencies are clear or resolved for the particular VSU store instruction, as per block 430. The data dependencies for the particular VSU store instruction may clear or resolve if VSU 0 or VSU 1 completes execution for that particular VSU store instruction. If the data dependencies are not clear for the particular VSU store instruction, then BUIQ 300 continues testing, as per block 430. However if all data dependencies are clear for the particular instruction, UIQ 0 clears the location for the particular VSU store instruction, as per block 440. In other words, the particular store instruction location in UIQ 0 is available for a next instruction as the particular VSU store instruction issues. Dispatch unit 220 dispatches a next VSU store instruction to UIQ 0, as per block 445. The next VSU store instruction dispatches to UIQ 0 independent of a next VSU store instruction dispatching to UIQ 1.

BUIQ 300 also performs a test to determine if all "address" dependencies are clear for the particular VSU store instruction, as per block 450. The address dependencies for the particular VSU store instruction may clear if LSU 0 or LSU 1 completes execution for that particular VSU store instruction. If the address dependencies are not clear for the particular VSU store instruction, then BUIQ 300 continues testing, as per block 450. However if all address dependencies are clear for the particular instruction, UIQ 1 clears the location for the particular VSU store instruction, as per block 460. In other words, the particular store instruction location in UIQ 1 is available for a next instruction as the particular VSU store instruction issues. Dispatch unit 220 dispatches a next VSU store instruction to UIQ 1, as per block 465. The next VSU store instruction dispatches to UIQ 1 independent of a next VSU store instruction dispatching to UIQ 0.

BUIQ 300 performs a test to determine if all VSU store instruction executions are complete, as per block 470. If there are still VSU store instructions to execute, BUIQ assigns the next VSU store instruction UIQ data and address assignments, as per block 425. However, if all VSU store instruction are complete in execution, the UIQ VSU store instruction dependency method ends, as per block 480. In one embodiment, the disclosed UIQ VSU store instruction method provides separate tracking of VSU store-address readiness for issue and VSU store-data readiness for issue without limiting the dispatch bandwidth of VSU stores. One VSU store instruction may issue concurrently or independently to more than one execution unit, such as VSU and LSU execution units. The dispatch unit 220 may provide dual dispatch of VSU instruction groups or IOP groups to both UIQ 0 and UIQ 1 portions of the bifurcated UIQ 300.

The foregoing discloses methodologies wherein a processor may employ UIQ VSU store instruction dependency UIQ operations after VSU store instruction fetch. A decode unit may decode VSU store instructions and branch instructions into an IOP group of process related instructions. A dispatch unit may dispatch one or more VSU store instruction to separate portions of a bifurcated UIQ at the same time. The BUIQ may employ independent data and address matrices to provide VSU store instruction dependency data. A UIQ maintains VSU store instruction and dependency matrix (DM) resources to provide independent data and address dependency capability. A particular VSU store instruction may issue from UIQ 0 and UIQ 1 independently. In this manner the dispatch unit may avoid or reduce dispatch delays for the results of any particular VSU store instruction data or address dependency calculation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of processing instructions, comprising:
    fetching, by a fetch unit, instructions from a memory store to provide fetched instructions;
    decoding, by a decode unit, the fetched instructions into decoded instructions and determining which of the decoded instructions are vector scalar unit (VSU) store instructions;
    grouping, by the decode unit, VSU store instructions into internal operation (IOP) groups wherein each IOP group includes a group of VSU store instructions;
    dual dispatching, by the dispatch unit, VSU store instructions into a bifurcated unified issue queue (BUIQ) that includes a first unified issue queue and a second unified issue queue; and
    storing, by the BUIQ, a same VSU store instruction from the group of VSU store instructions in both the first unified issue queue and the second unified issue queue, the BUIQ storing the same VSU instruction in the first unified issue queue along with data dependency information, the BUIQ storing the same VSU instruction in the second unified issue queue along with address dependency information, such that the first unified issue queue and the second unified issue queue independently manage data dependencies and address dependencies, respectively.

2. The method of claim 1, further comprising storing, by the BUIQ, the data dependency information in a data dependency matrix associated with the first unified issue queue.

3. The method of claim 2, further comprising storing, by the BUIQ, the address dependency information in an address dependency matrix associated with the second unified issue queue.

4. The method of claim 3, wherein the data dependency matrix provides data dependency information for a particular VSU store instruction independent of the address dependency information that the address dependency matrix provides for the particular VSU store instruction.

5. The method of claim 4, wherein the address dependency matrix provides address dependency information for a particular VSU store instruction independent of the data dependency information that the data dependency matrix provides for the particular VSU store instruction.

6. A processor, comprising:
    a memory store that stores instructions;
    a fetch unit, coupled to the memory store, that fetches instructions from the memory store to provide fetched instructions;
    a decode unit, coupled to the fetch unit, that decodes the fetched instructions into decoded instructions, the decode unit determining which of the decoded instructions are vector scalar unit (VSU) store instructions, the decode unit grouping the VSU store instructions into internal operation (IOP) groups; and
    a dispatch unit, coupled to the decode unit, that dispatches VSU store instructions; and a bifurcated unified issue queue (BUIQ) that includes a first unified issue queue and a second unified issue queue, wherein the BUIQ stores a same VSU store instruction from the group of VSU store instructions in both the first unified issue queue and the second unified issue queue, the BUIQ storing the same VSU instruction in the first unified issue queue along with data dependency information, the BUIQ storing the same VSU instruction in the second unified issue queue along with address dependency information, such that the first unified issue queue and the second unified issue queue independently manage data dependencies and address dependencies, respectively.

7. The processor of claim 6, wherein the bifurcated unified issue queue (BUIQ) includes a data dependency matrix that stores the data dependency information, the data dependency matrix being associated with the first unified issue queue.

8. The processor of claim 7, wherein the bifurcated unified issue queue (BUIQ) includes an address dependency matrix that stores the address dependency information, the address dependency matrix being associated with the second unified issue queue.

9. The processor of claim 8, wherein the data dependency matrix provides data dependency information for a particular VSU store instruction independent of the address dependency information that the address dependency matrix provides for the particular VSU store instruction.

10. The processor of claim 9, wherein the address dependency matrix provides address dependency information for a particular VSU store instruction independent of the data dependency information that the data dependency matrix provides for the particular VSU store instruction.

11. An information handling system (IHS), comprising
a system memory; and
a processor that includes:
a memory store that stores instructions;
a fetch unit, coupled to the memory store, that fetches instructions from the memory store to provide fetched instructions;
a decode unit, coupled to the fetch unit, that decodes the fetched instructions into decoded instructions, the decode unit determining which of the decoded instructions are vector scalar unit (VSU) store instructions, the decode unit grouping the VSU store instructions into internal operation (IOP) groups; and
a dispatch unit, coupled to the decode unit, that dispatches VSU store instructions; and
a bifurcated unified issue queue (BUIQ) that that includes a first unified issue queue and a second unified issue queue, wherein the BUIQ stores a same VSU store instruction from the group of VSU store instructions in both the first unified issue queue and the second unified issue queue, the BUIQ storing the same VSU instruction in the first unified issue queue along with data dependency information, the BUIQ storing the same VSU instruction in the second unified issue queue along with address dependency information, such that the first unified issue queue and the second unified issue queue independently manage data dependencies and address dependencies, respectively.

12. The IHS of claim 11, wherein the bifurcated unified issue queue (BUIQ) includes a data dependency matrix that stores the data dependency information, the data dependency matrix being associated with the first unified issue queue.

13. The IHS of claim 12, wherein the bifurcated unified issue queue (BUIQ) includes an address dependency matrix that stores the address dependency information, the address dependency matrix being associated with the second unified issue queue.

14. The IHS of claim 13, wherein the data dependency matrix provides data dependency information for a particular VSU store instruction independent of the address dependency information that the address dependency matrix provides for the particular VSU store instruction.

* * * * *